(12) United States Patent
Janssen (10) Patent No.: US 6,710,922 B2
(45) Date of Patent: Mar. 23, 2004

(54) OPTICAL FILTERS

(75) Inventor: Adrian P Janssen, Devon (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/011,078

(22) Filed: Dec. 7, 2001

(65) Prior Publication Data

US 2003/0107811 A1 Jun. 12, 2003

(51) Int. Cl.[7] ............................................... G02B 27/00
(52) U.S. Cl. ..................... 359/577; 359/265; 359/584; 359/589; 356/454; 356/519
(58) Field of Search ................. 359/577, 584, 359/588, 589, 357, 260; 356/454, 519; 156/99; 385/24; 372/99

(56) References Cited

U.S. PATENT DOCUMENTS

| 5,212,584 A | * | 5/1993 | Chung ........................ 359/260 |
| 6,208,444 B1 | * | 3/2001 | Wong ......................... 359/127 |
| 6,215,592 B1 | * | 4/2001 | Pelekhaty .................... 359/618 |
| 2002/0080493 A1 | * | 6/2002 | Tsai et al. ................... 359/584 |

* cited by examiner

*Primary Examiner*—Drew Dunn
*Assistant Examiner*—Leo Boutsikaris
(74) *Attorney, Agent, or Firm*—Barnes & Thornburg (57) ABSTRACT

A multi cavity comb filter for interleaving or de-interleaving WDM signals has a plurality of stacked optical cavities each having substantially the same thickness. The multiple cavity arrangement provides a comb reflection response and a comb transmission response with broad peaks, so that the filter can be used for transmitting one group of channels and reflecting another group of channels at interleaved positions. The cavities are preferably formed from silicon wafers, so that existing techniques can be employed to obtain specific cavity thicknesses with sufficient accuracy and uniformity.

12 Claims, 8 Drawing Sheets

OPTICAL FILTERS

FIELD OF THE INVENTION

The present invention relates to optical filters, and particularly to filters which can be used for separating interleaved channels from a WDM signal or for interleaving groups of channels.

BACKGROUND OF THE INVENTION

Wavelength division multiplexing (WDM) is a technique widely used in optical communications systems to allow different wavelengths to be carried over a common fiber (or fiber optic waveguide). The most commonly used wavelength band for fiber optic transmission is centered at 1550 nm, because of the low absorption and the commercial availability of erbium doped fiber amplifiers which are effective for this band.

Wavelength division multiplexing can separate this band into multiple channels, typically 32 or 64 multiple discrete channels, through a technique referred to as dense channel wavelength division multiplexing (DWDM). This is used to increase long-haul telecommunication capacity over existing fiber optic transmission lines.

Techniques and devices are required, however, for multiplexing and de-multiplexing the different discrete carrier wavelengths. Multiplexing and de-multiplexing will typically take place not only at the source and destination of the data, but also at intermediate routing locations, particularly if a network provides per-channel routing capability and per-channel add and drop functions. Thus, each routing device requires the multiplexing and de-multiplexing capability.

Various types of optical multiplexer are well known for the combination or separation of optical signals in wavelength division multiplexed systems. Known devices for this purpose have employed, for example, diffraction gratings, prisms and various types of fixed or tuneable filters.

Regardless of the type of multiplexer and de-multiplexer to be employed, as the channel separation is reduced in order to increase the system capacity, the multiplexer filtering characteristics need to be improved to ensure separation of channels without cross talk between adjacent channels.

Channel interleaving is one technique which has been used to enable two groups of channels to be processed separately, with the channels in each group having greater separation. This reduces the required optical performance of the optical components used within the processing equipment for each group of channels. This invention is particularly directed to an optical filter which enables two groups of interleaved channels to be separated or combined.

SUMMARY OF THE INVENTION

According to the invention, there is provided an optical filter comprising a plurality of stacked optical cavities each having substantially the same thickness, the filter having a first frequency response for transmission through the filter comprising a first comb response and a second frequency response for reflection from the filter and comprising a second comb response, the peaks of the first comb response lying between the peaks of the second comb response.

The multiple cavity arrangement in this filter enables the peaks in the reflection response and the peaks in the transmission response to be broadened (with respect to a single cavity response), so that the filter can be used for transmitting one group of channels and reflecting another group of channels at interleaved positions. The cavities are preferably formed from silicon wafers, so that existing techniques can be employed to obtain specific cavity thicknesses with sufficient accuracy and uniformity.

The thickness of the cavities is selected as a function of the channel spacing, and determines the separation between the peaks of the two comb responses. The spacing between cavities is selected as function of the wavelength band over which the filter is to be used.

The thickness of each cavity may therefore be selected such that the spacing between peaks of each comb response corresponds to double the channel spacing in a WDM optical communications system in which the filter is to be used.

The spacing between adjacent cavities may be equal to one quarter of a wavelength within a band of wavelengths of channels of a WDM optical communications system in which the filter is to be used.

Preferably, adjacent cavities are separated by an air spacing. The large refractive index difference between silicon and air enables a small number of cavities to achieve the required filter response. For example, only three cavities can achieve the required pass band profile for DWDM optical communications systems.

The thickness of the silicon wafer of each cavity may be between 180 and 210 microns, and this is appropriate for use with a channel separation of 0.8 nm which is the standard 100 GHz grid. More preferably in this example, the thickness of the silicon wafer of each cavity is between 194.5 and 195.0 microns.

A support layer may be provided between the cavities for defining the air spacing, the support layer comprising an oxide layer.

This layer may define a spacing between adjacent cavities of 0.36–0.41 microns. This range corresponds to one quarter of the wavelength of signals in the C-band.

The invention also provides a method of manufacturing an optical filter, comprising:

preparing a silicon wafer having a predetermined thickness;

depositing an oxide layer over the silicon wafer;

patterning the oxide layer to define a plurality of pattern portions;

dividing the wafer into sections, each section comprising a pattern portion;

stacking a plurality of the sections to define a multiple cavity filter, the wafer sections each defining a cavity and the pattern portions defining a spacing between adjacent cavities.

This method enables a single silicon wafer to be used to form all cavities of the filter, thereby ensuring uniform thickness and enabling precise thickness control using conventional silicon wafer processing techniques. For example, double sided polishing may be used, and with feedback control based on optical thickness measurement, for example infrared interferometric sensing.

The invention provides a low cost process which can be accurately controlled.

The spacing between cavities is preferably determined by an oxide layer, which can also be deposited and patterned to the requited accuracy using conventional semiconductor device processing technology.

The pattern portions may each comprise a central opening around which one or more support portions of predetermined thickness are provided. The opening then defines the air cavity in the assembled device, and the support portion provides the required cavity separation.

The silicon wafer is preferably prepared to have a thickness between 180 and 210 microns. The oxide layer may be deposited with a thickness of 0.32–0.44 microns, preferably 0.37–0.39 microns.

The stacked sections are preferably diffusion bonded.

The invention is also directed to the use of an optical filter of the invention for interleaving or de-interleaving two groups of channels of a WDM optical signal. The invention also provides an optical communications system using a filter of the invention for interleaving or de-interleaving two groups of channels of a WDM optical signal.

BRIEF DESCRIPTION OF THE DRAWINGS

Examples of the invention will now be described in detail with reference to the accompanying drawings, in which.

DETAILED DESCRIPTION

Figure 1:
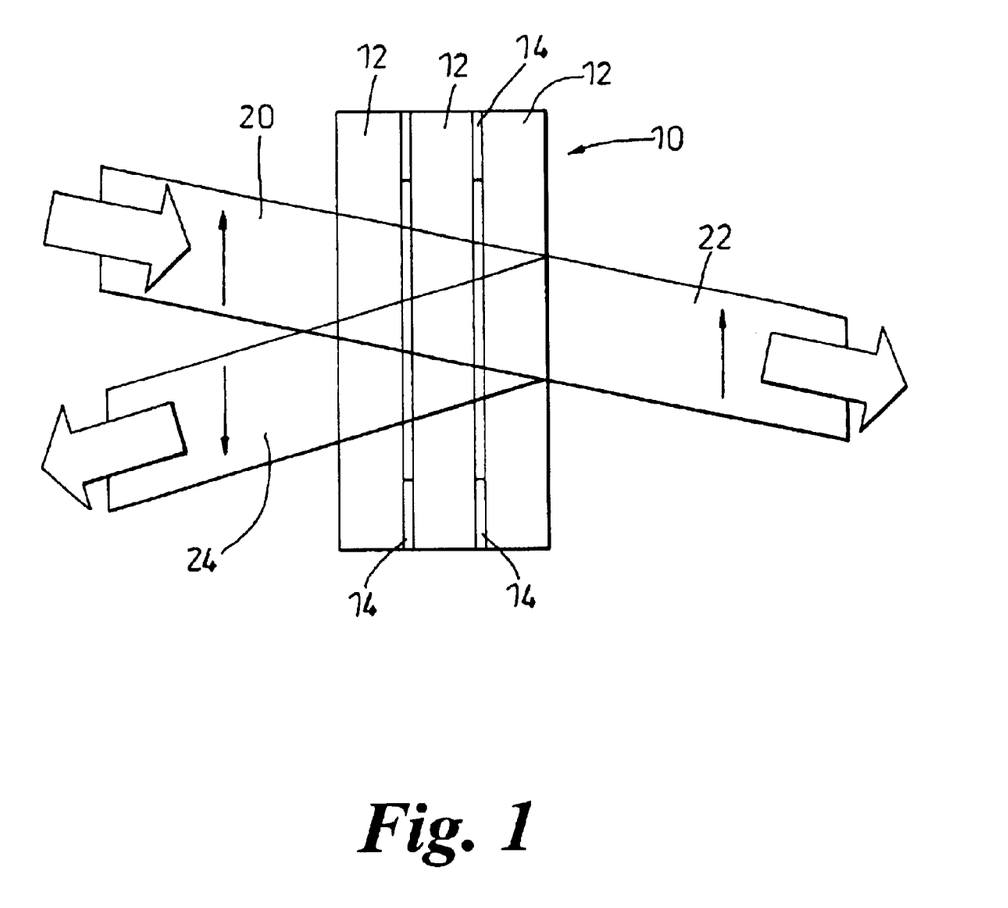
FIG. 1 shows a filter in accordance with the invention.

FIG. 1 shows a filter 10 in accordance with the invention, comprising three stacked optical cavities 12 of equal thickness. The cavities are spaced by spacers 14. Each cavity provides a Fabry-Perot cavity frequency response, determined by the so-called "Airy" function. By providing a number of cavities, the transmission and reflection transfer function is altered to provide flatter peaks, so that a comb filter response results. Thus, the filter has a comb transmission frequency response and a comb reflection frequency response, with the peaks of the transmission comb response lying between the peaks of the reflection comb response.

As a result, the filter can be used to divide a WDM signal 20 comprising frequency components $\lambda_1, \lambda_2, \lambda_3 \ldots \lambda_n$ into a first group of channels 22 transmitted through the filter, and a second group of channels 24 reflected by the filter. For example, the first group of channels 22 has the odd channels $\lambda_1, \lambda_3$ etc, and the second group of channels 24 has the even channels $\lambda_2, \lambda_4$ etc.

The input WDM signal is provided at an angle to the filter, so that the reflected channels can be collected.

The thickness of the cavities 12 is selected as a function of the channel spacing, and determines the separation between the peaks of the transmission and reflection comb responses. In particular, the free Spectral Range (FSR) for a single cavity Fabry Perot is given by:

$$FSR = \lambda_0^2 / (2nd)$$

where $\lambda_0$ is the centre wavelength of operation, n is the refractive index of the cavity and d is the physical length of the cavity.

This equation can be used to derive the cavity length for a required FSR, which corresponds to the separation of the peaks in the comb response. For example, for a frequency corresponding to wavelength 1530 nm (one standardised frequency is 1530.48 nm) and with channel separation 0.8 nm (giving an FSR of 1.6 nm and corresponding to a 100 GHz grid), with a silicon cavity (refractive index 3.63), we obtain a physical cavity length of 202 microns.

In practice, a slightly smaller thickness is required due to the angle of incidence, which may be, for example 3 degrees. Thus, the required cavity thickness for C band operation using a 100 GHz grid with a silicon wafer works out to be approximately 195 microns, particularly between 194.5 and 195.0 microns.

The spacing between cavities is selected to be one quarter wavelength of the wavelength over which the filter is to be used. For use in the C-band (1524 nm–1563 nm), the cavity separation is selected to be one quarter wavelength of any wavelength in this range, for example based on 1528 nm, giving a thickness of 382 nm.

For using the filter as a de-interleaving filter, the thickness of each cavity is selected so that the spacing between the comb peaks corresponds to double the channel spacing of the WDM optical communications system.

The frequency response of the filter is a function of the refractive index of the material defining the cavity and the material in the spacing. In particular, the greater the refractive index difference, the fewer cavities are required to obtain the required frequency response.

In the preferred embodiment of the invention, each cavity is defined by a silicon wafer, and adjacent cavities are separated by an air spacing. The use of silicon wafers enables existing techniques to be employed to obtain specific cavity thicknesses with sufficiently accuracy and uniformity.

Figure 2:
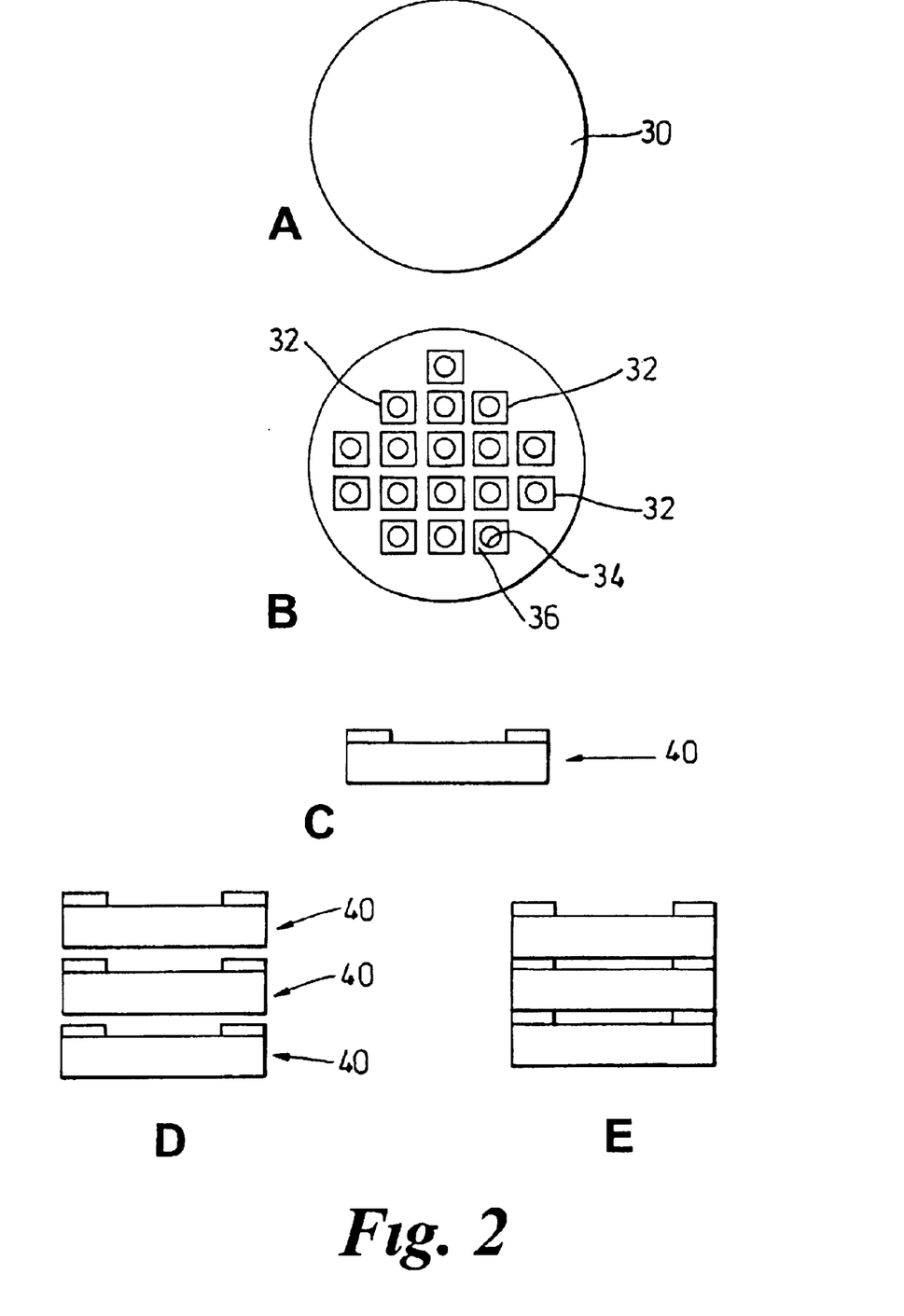
FIG. 2 shows the method of manufacturing the filter of FIG. 1.

FIG. 2 shows the method of manufacturing the filter. FIG. 2A shows a silicon wafer 30 prepared to have the desired thickness, using conventional silicon processing techniques, for example double-sided polishing controlled using optical thickness measurement. This optical thickness measurement preferably comprises infrared thickness sensing.

In FIG. 2B, an oxide layer, for example $SiO_2$, is deposited over the silicon wafer to the desired spacing and is then patterned to define the regions 32. These regions have an opening 34 and a support 36 surrounding the opening 34. The oxide layer is patterned using conventional photolithographic techniques.

The wafer is then divided into sections 40 as shown in FIG. 2C, each section comprising one of the regions 32. They are then physically stacked as shown in FIG. 2D and diffusion bonded as shown in FIG. 2E. This diffusion bonding will compact the oxide layer, and the original deposition thickness of the oxide layer will take into account the change in thickness resulting from the diffusion bonding process.

Figure 3:
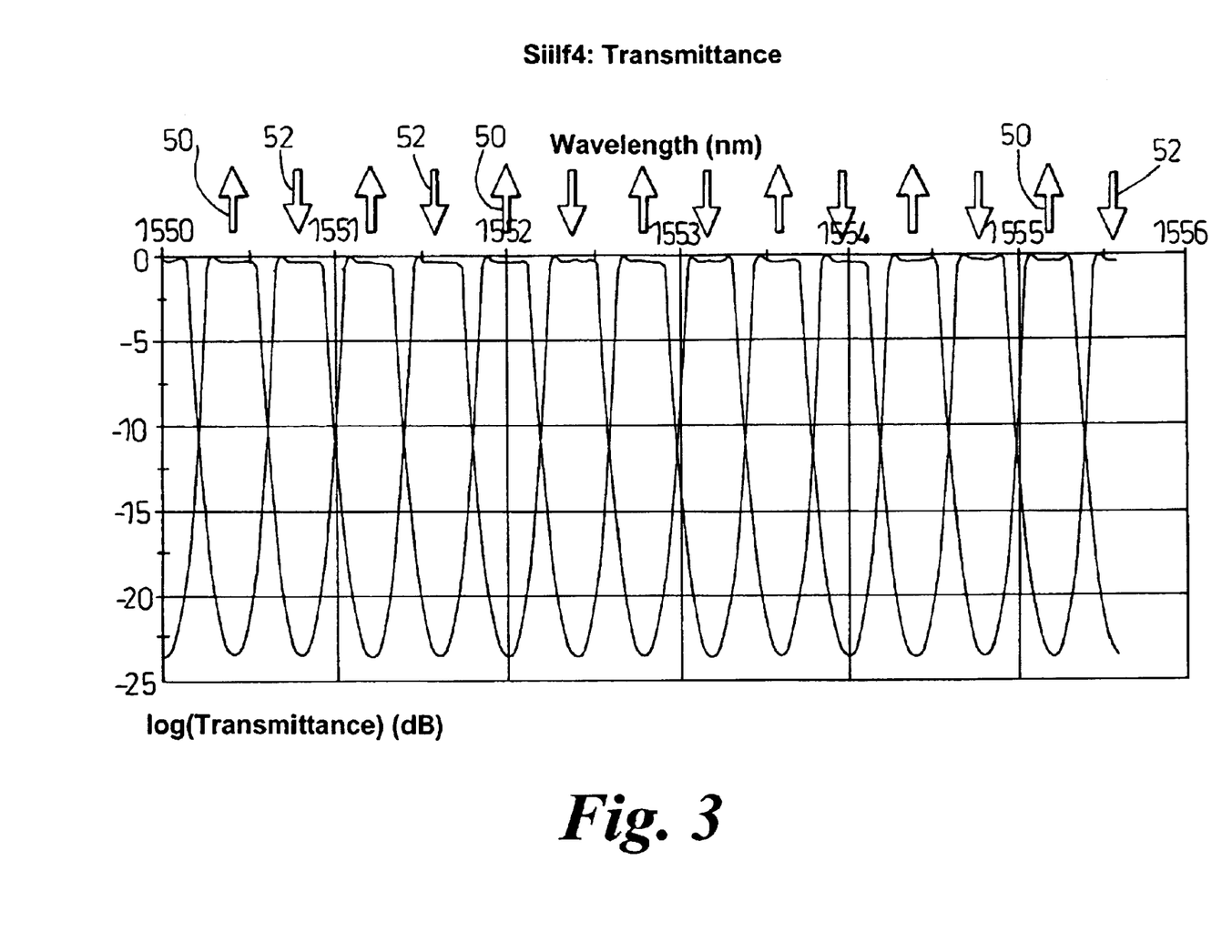
FIG. 3 shows the transmission and reflection response of the filter of FIG. 1.

FIG. 3 shows the transmission and reflection response of the filter when used for a 50 GHz grid. Of course, this requires a different thickness of silicon cavity. The filter of the invention can, however, be tuned to any desired comb separation by calculating the thicknesses in the manner set out above.

The upward arrows 50 in FIG. 3 indicate the transmitted frequency bands which together define a first comb frequency response, and the downward arrows 52 indicate the reflected frequency bands which together define a second comb frequency response. In this example, the channels have a separation of 0.4 nm for the 50 GHz grid. The filter rejection is around −23 dB, and each comb peak has a reasonably flat attenuation of less than 1 dB over a wavelength band of around 0.3 nm.

Figure 4:
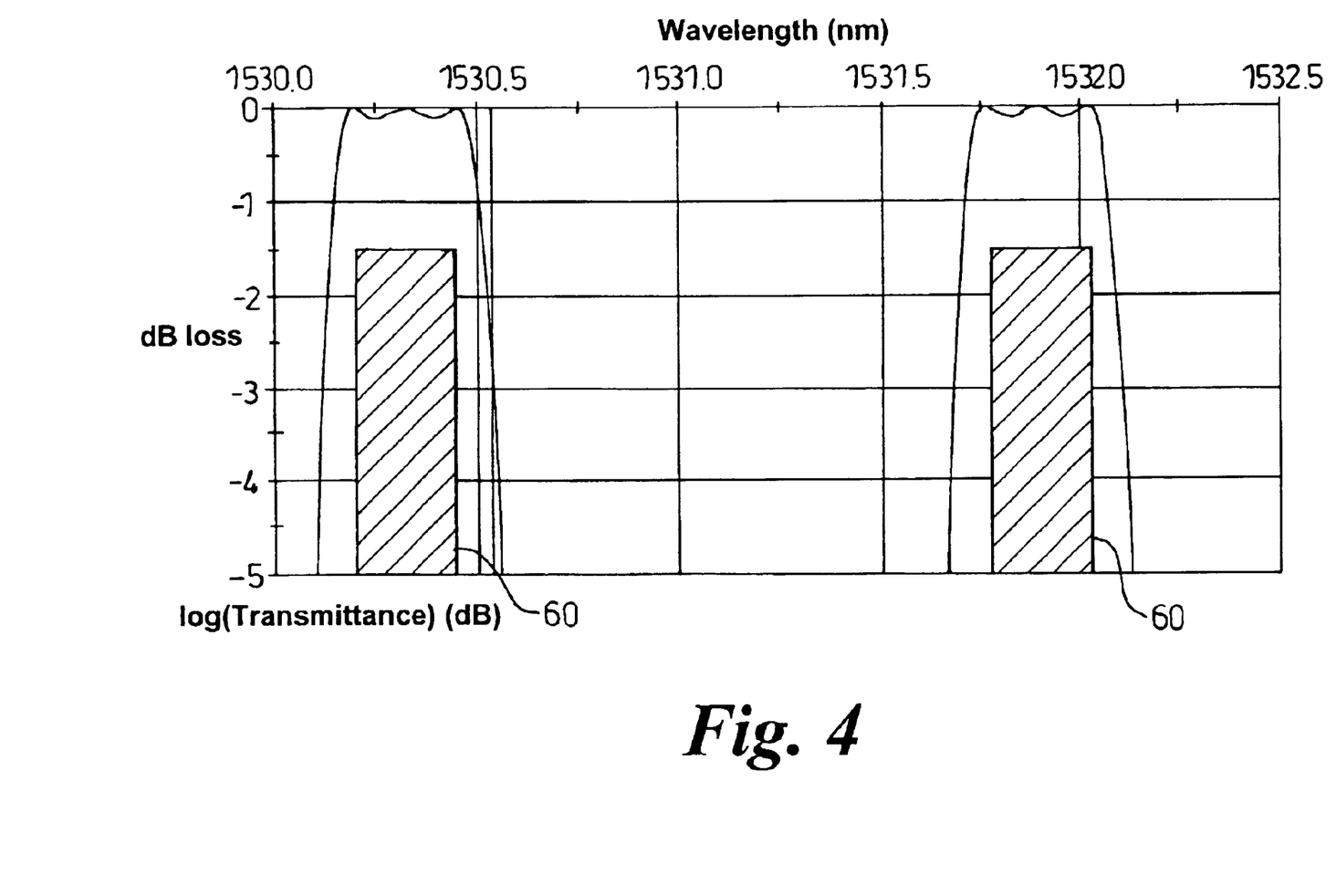
FIG. 4 shows the relationship between one peak of the filter response and a standard pass band of a multiplexer filter.
Figure 5:
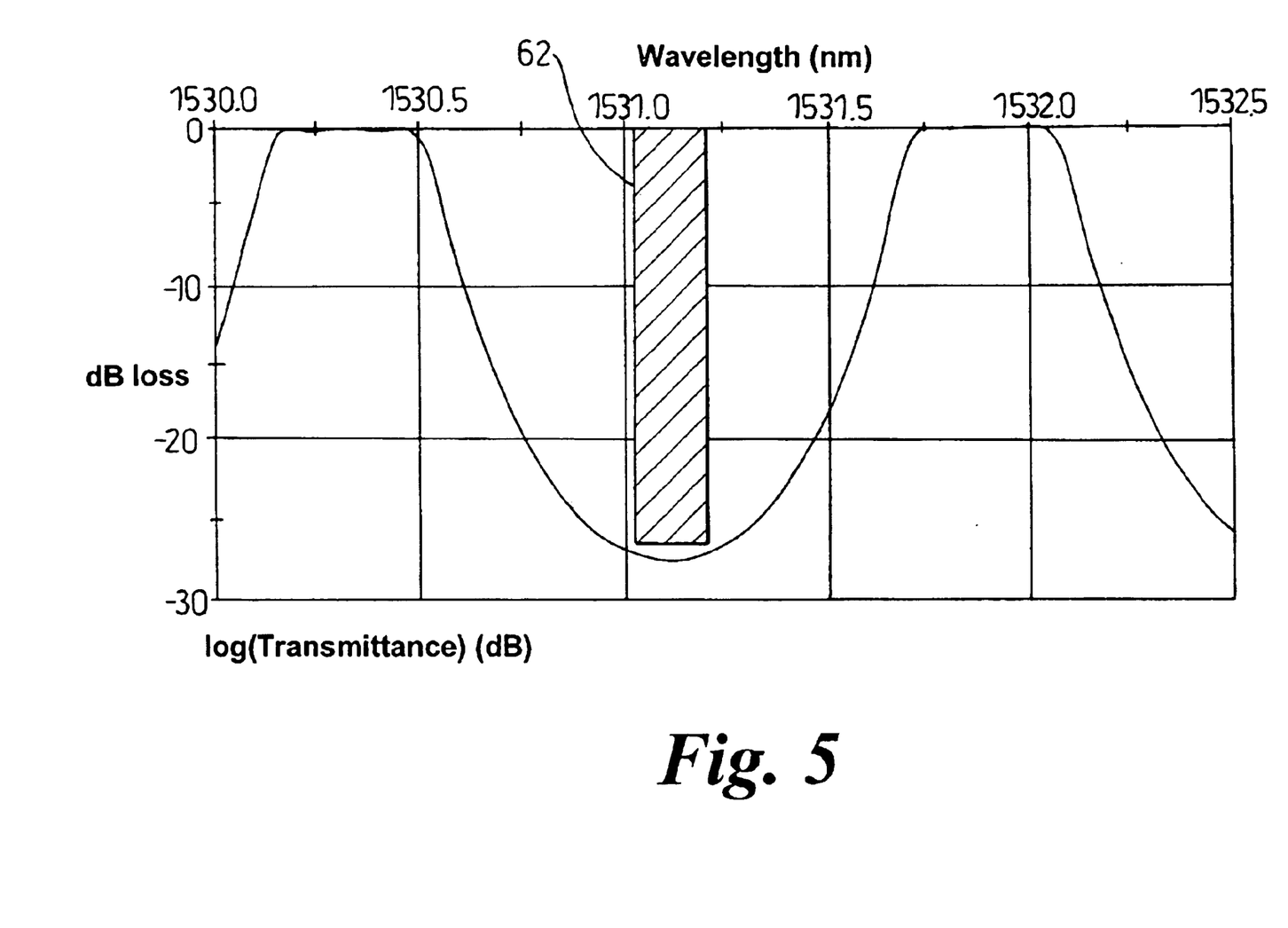
FIG. 5 shows the relationship between one trough of the filter response and a standard rejection band of a multiplexer filter.

FIG. 4 shows two adjacent peaks in one of the comb responses in a filter designed for the 100 GHz grid, namely with a channel separation of 0.8 nm, and shows that the comb filter response exceeds an example of a known band pass profile 60 required by multiplexing filters. FIG. 5 shows that the rejection between channels of the comb filter response (around 27 dB for a filter designed for 0.8 nm channel separation, as shown) also exceeds an example of a known rejection profile 62 required by multiplexing filters.

Figure 6:
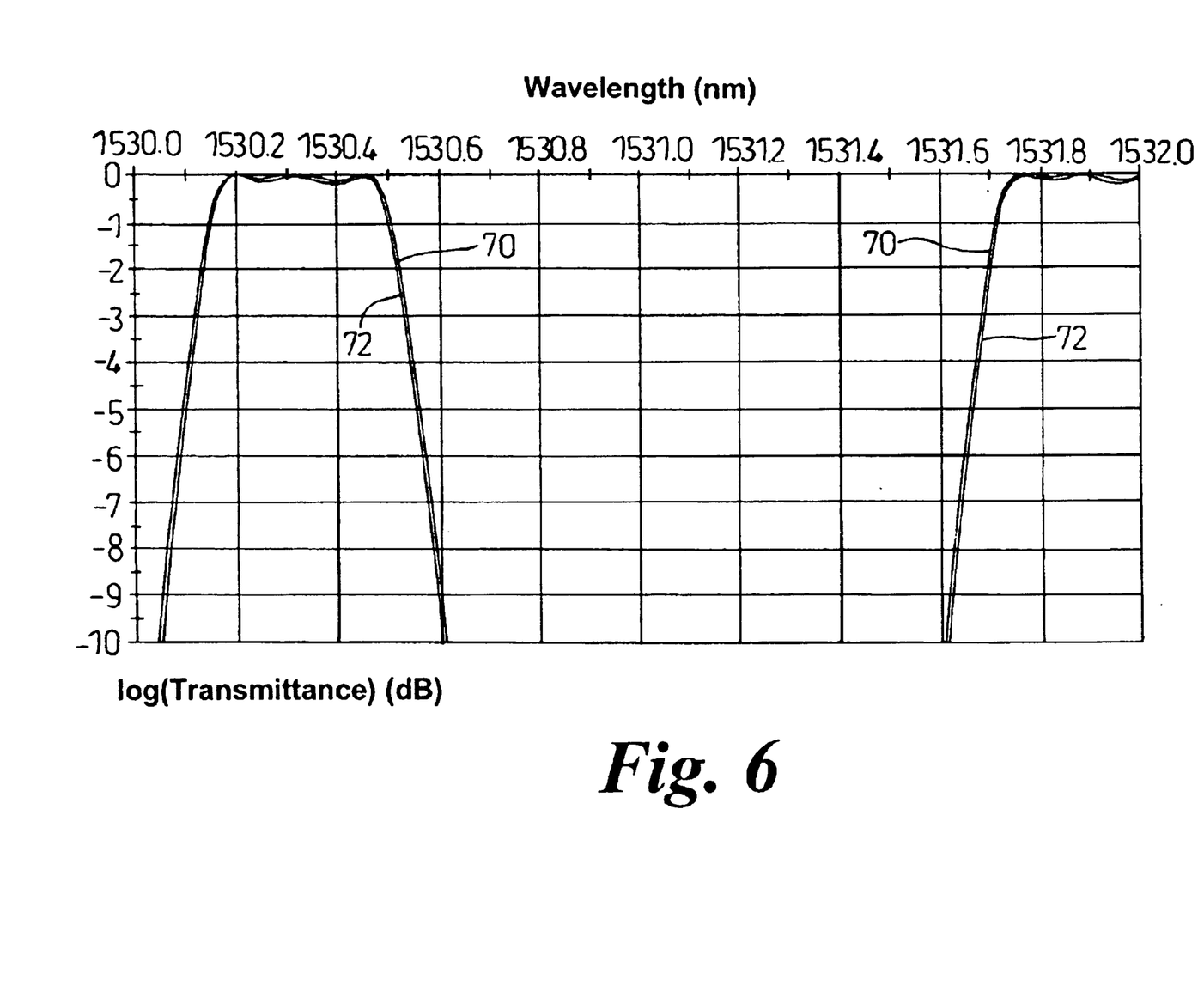
FIG. 6 is used to show the dependency of the filter response on the silicon thickness.

The thickness of the silicon wafer should be accurately controlled during manufacture. FIG. 6 shows the dependency of the filter response on the silicon thickness, and shows two theoretical plots 70,72 for filters with silicon thickness varying by 3 nm. In practice, it is sufficient to control the silicon wafer thickness to within around ±10 nm from the desired thickness.

Figure 7:
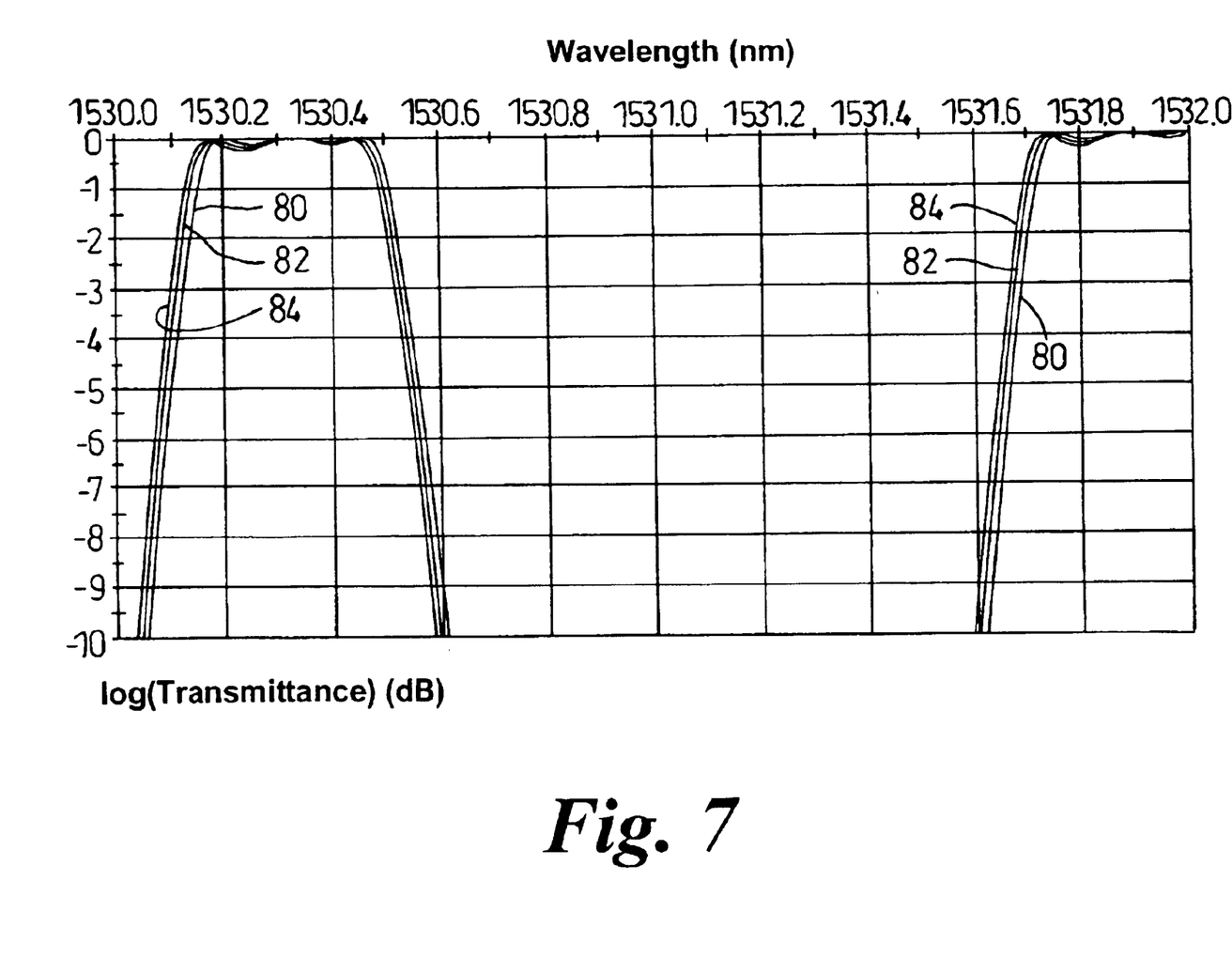
FIG. 7 is used to show the dependency of the filter response on the spacer layer thickness.

The thickness of the oxide spacer layer should also be accurately controlled during manufacture. FIG. 7 shows the dependency of the filter response on the cavity spacing, and shows three theoretical plots 80,82, 84 for filters with the cavity spacing at the desired dimension, 30 nm from the desired dimension and 50 nm from the desired dimension. In practice, it is sufficient to control the silicon wafer thickness to within around ±50 nm from the desired thickness.

These thickness controls can be achieved using known processing techniques used in the semiconductor device manufacture industry.

Figure 8:
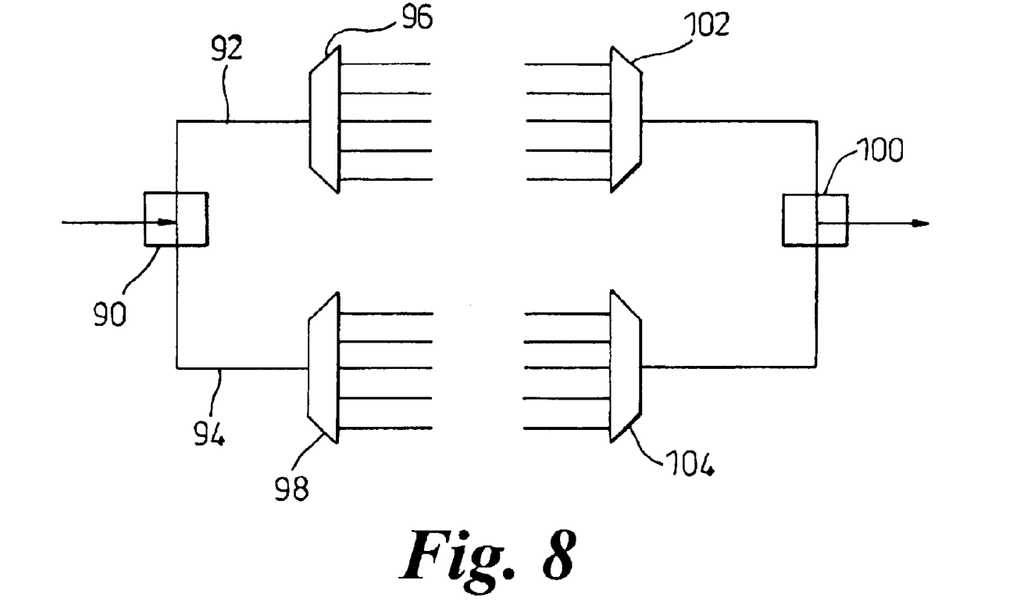
FIG. 8 shows the filter used for de-interleaving and interleaving.

FIG. 8 shows how the filter of the invention can be used within a demultiplexer and multiplexer function. A filter of the invention 90 acts as a de-interleaver and divides the WDM signal into the odd channels 92 and the even channels 94. Each of these groups is passed to a conventional de-multiplexer 96, 98, for example arrayed waveguide de-multiplexers. The channels at the input to these de-multiplexers have double the spacing of the WDM channels, so that the required optical performance of the de-multiplexers is lower.

In order to interleave channels, the filter of the invention 100 is again employed, with the direction of signals through the filter reversed. The interleaver 100 combines the channels from the two multiplexers 102,104.

Figure 9:
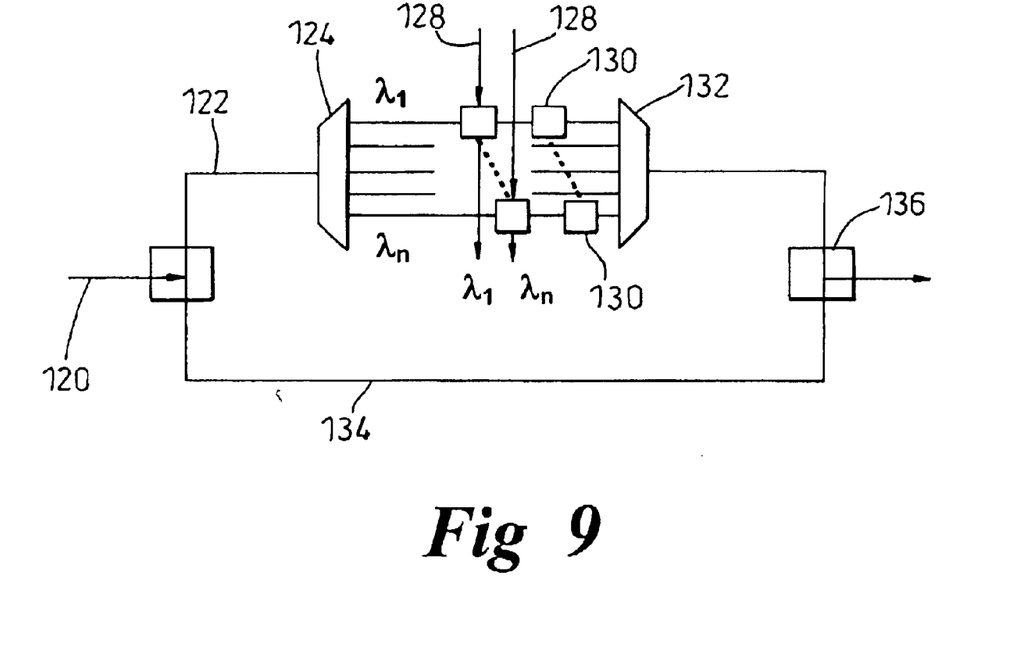
FIG. 9 shows one possible use of the filter of the invention to provide add/drop functions.

FIG. 9 shows the use of the filter of the invention to provide add/drop capability in a node. The input 120 carries the WDM signal, and in this example, add/drop capability is only required for a sub-set of the channels, and this capability is provided for the group of channels 122.

After de-multiplexing at 124, the individual channels from the group 122 are each supplied to an optical switch 126. The switch enables a channel from the de-multiplexer 124 to be dropped or else passed forward. Alternatively, the switch 126 can enable an external signal 128 to be added. Each switch comprises a 2×2 optical switch, and enables add or drop functions to be implemented for each channel.

The channels passing forwards (either added or passed through) are each passed through a variable optical attenuator (VOA) 130 and then combined in a multiplexer 132. The VOAs ensure the signals have optical powers appropriate for the system, for example dependent upon the receiver characteristics within the system.

In the example of FIG. 9 add/drop capability is provided for one group of channels 122, and the other group of channels 134 is passed through the node and recombined with the output from the multiplexer 132 at a filter of the invention 136 arranged to provide an interleaving function.

The filter of the invention can be used in other optical processing devices, and essentially enables channels to be divided into groups so that channels with greater separation can be further processed.

The specific example of filter of the invention uses a silicon cavity, and this is the preferred material to enable the thickness to be processed accurately. However, other materials may be used, and this will result in different thickness requirements as a result of the different refractive index. A material may be provided between the cavities instead of the air spacing described above.

Similarly, the filter of the invention can be used in a range of wavelength bands. In the specific examples above, the filter is used in the C-band. However, technologies are being developed enabling the L-band and S-band to be used in optical communications systems, and the filter of the invention can be used for these wavelength bands. Again, this will alter the required layer thicknesses. Thus, it will be understood that the specific layer thicknesses given are in respect of the one specific example of the use of the filter.

Various other modifications will be apparent to those skilled in the art.

I claim:

1. An optical filter comprising a plurality of stacked optical cavities each having substantially the same thickness, wherein an oxide support layer is provided between adjacent cavities defining an air spacing, the filter having a first frequency response for transmission through the filter comprising a first comb response and a second frequency response for reflection from the filter and comprising a second comb response, the peaks of the first comb response lying between the peaks of the second comb response.

2. An optical filter as claimed in claim 1, wherein each cavity is formed from a silicon wafer.

3. A filter as claimed in claim 1, wherein the thickness of each cavity is selected such that the spacing between peaks of each comb response corresponds to double the channel spacing in a WDM optical communications system in which the filter is to be used.

4. A filter as claimed in claim 1, wherein the spacing between adjacent cavities is equal to one quarter of a wavelength within a band of wavelengths of channels of a WDM optical communications system in which the filter is to be used.

5. A filter as claimed in claim 1, wherein the thickness of each cavity is given by:

$$d = \lambda_0^2 / (2n \cdot \text{FSR})$$

where $\lambda_0$ is a wavelength within a range of wavelengths for filtering by the filter, n is the refractive index of the cavity and FSR is desired spacing between adjacent peaks of the first and second comb responses.

6. A filter as claimed in claim 1, wherein the thickness of the silicon wafer of each cavity is between 180 and 210 microns.

7. A filter as claimed in claim 6, wherein the thickness of the silicon wafer of each cavity is between 194 and 195.5 microns.

8. A filter as claimed in claim 1, wherein the spacing between adjacent cavities is 0.36–0.41 microns.

9. A filter as claimed in claim 8, wherein the spacing between adjacent cavities is 0.37–0.39 microns.

10. A filter as claimed in claim 1, comprising three cavities.

11. A filter as claimed in claim 1, comprising a deinterleaving filter for deinterleaving a group of evenly spaced channels into first and second groups, wherein the spacing between the peaks of the first and second comb responses is equal to double the channel spacing.

12. An optical communications system comprising a filter as claimed in claim 1 for interleaving or de-interleaving two groups of channels of a WDM optical signal.

* * * * *